United States Patent [19]

Hong

[11] Patent Number: 5,305,709
[45] Date of Patent: Apr. 26, 1994

[54] BIRD FEEDER

[76] Inventor: Dong-Fuh Hong, No. 276, Fun-Tsao Road, Tsao-Tung Township, Nan-Tou Hsien, Taiwan

[21] Appl. No.: 127,059

[22] Filed: Sep. 27, 1993

[51] Int. Cl.⁵ .............................................. A01K 39/00
[52] U.S. Cl. ..................................... 119/57.8; 119/54
[58] Field of Search .................... 119/57.8, 52.1, 52.2, 119/52.4, 54; 222/78, 185, 457; D30/121, 124

[56] References Cited

U.S. PATENT DOCUMENTS

| | | | |
|---|---|---|---|
| D. 194,610 | 2/1963 | Hume | D30/124 X |
| 4,570,575 | 2/1986 | Hinz | 119/52.2 |
| 4,706,851 | 11/1987 | Hegedus et al. | 222/185 X |
| 5,025,753 | 6/1991 | Schneider | 119/57.8 X |
| 5,052,342 | 10/1991 | Schneider | 119/57.8 X |
| 5,215,039 | 6/1993 | Bescherer | 119/57.8 |

*Primary Examiner*—Thomas Price
*Attorney, Agent, or Firm*—Browdy and Neimark

[57] ABSTRACT

A bird feeder is made up of a decorating face plate and a feeding set. The decorating face plate is provided centrally with a through hole. The feeding set is composed of two shells and fastened to the through hole such that the interior of the through hole and the two shells form jointly a receiving space for keeping the feed. The two shells are provided respectively and correspondingly in the lower portion thereof with a feeding port. One of the two shells is furnished with a feed supplying port. The feeding ports of the feeding set are provided respectively with a protective mask fastened thereto. The protective masks are provided respectively in the lower portions thereof with a slot in communication with the receiving space.

2 Claims, 4 Drawing Sheets

BIRD FEEDER

FIELD OF THE INVENTION

The present invention relates generally to a feeding device, and more particularly to a bird feeder, which is provided with means to prevent the feed from being blown away from the bird feeder and showered by the rain, and which can be also used for an ornamental purpose.

BACKGROUND OF THE INVENTION

There are a variety of bird feeders available in the market today. Most of the conventional bird feeders are generally of a canister-like construction and rectangular in shape. Such conventional bird feeders are provided on the back thereof with a hook for use in hanging the bird feeders in a bird cage or on a support frame such that a bird can have an easy access to the feed through an opening located in the top of the feeder. The feed kept in such conventional bird feeders as described above is often spoiled or decomposed by the climatic elements such as the wind and the rain. In order to find a better way to feed the birds, some manufacturers have designed and disclosed a new bird feeder which comprises an upper housing and a lower housing. The birds have an access to the feed through a plurality of feeding ports located in the lower housing. The feed is put into the lower housing via an opening located at the center of the top of the lower housing. The upper housing of the new bird feeder serves as a protective shield preventing the feed kept in the lower housing from being exposed to the wind and the rain.

Generally speaking, the conventional bird feeders described above are not artistically embellished and are monotonously designed.

SUMMARY OF THE INVENTION

It is therefore the primary objective of the present invention to provide a bird feeder with means capable of preventing the feed kept in the bird feeder from being exposed to such weathering elements as wind, rain, snow, etc. In addition, the bird feeder of the present invention is ornamentally designed.

The foregoing objective of the present invention is attained by a bird feeder which is made up of a decorating face plate and a feeding set. The decorating face plate is provided centrally with a through hole. The feeding set is composed of two shells of transparent material and fastened to the through hole of the decorating face plate. A receiving space is formed jointly by the interior of the through hole and the two shells of arcuate construction. The two shells are provided respectively and correspondingly in the lower portion thereof with a feeding port. One of the two shells is furnished with a feed supplying port. The feeding ports of the feeding set are provided respectively with a protective mask fastened thereto. The protective masks are provided respectively in the lower portions thereof with a slot in communication with the receiving space.

The foregoing objective, features and functions of the present invention can be more readily understood by studying the following detailed description of the present invention in conjunction with the drawings provided herewith.

DETAILED DESCRIPTION OF THE INVENTION

Figure 1:
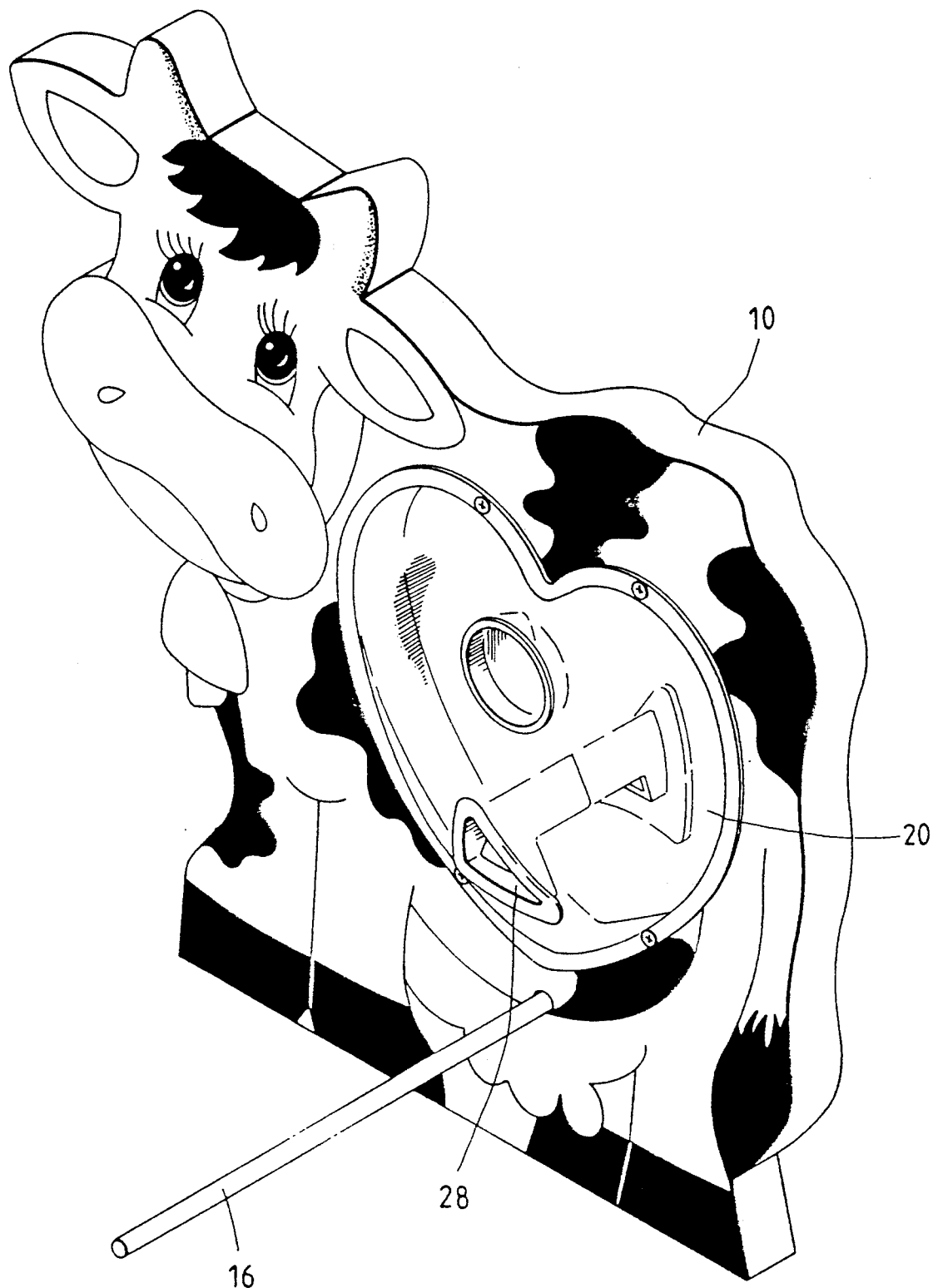
FIG. 1, shows a perspective view of a preferred embodiment of the present invention.
Figure 2:
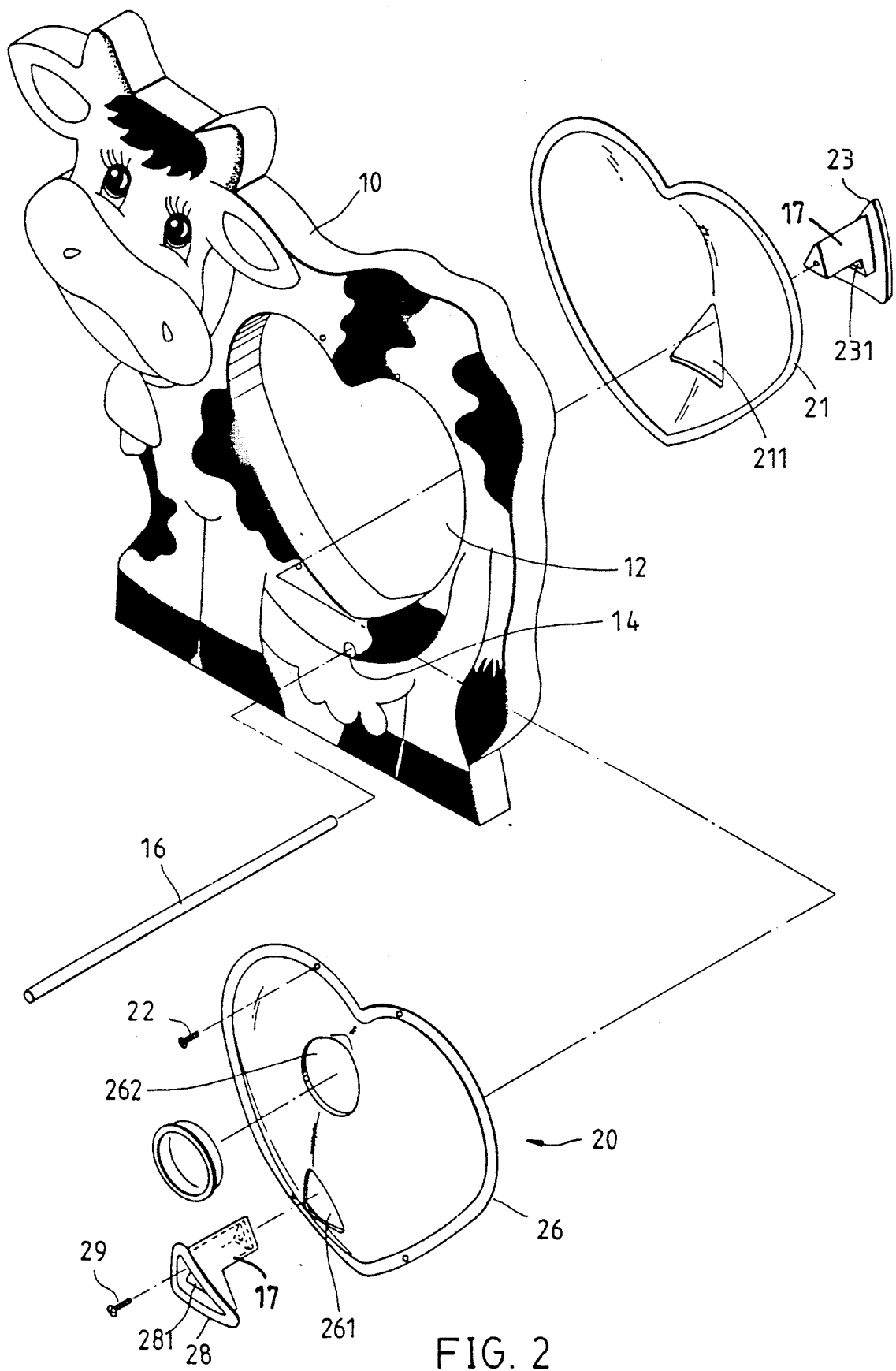
FIG. 2 shows an exploded view of the preferred embodiment of the present invention.
Figure 3:
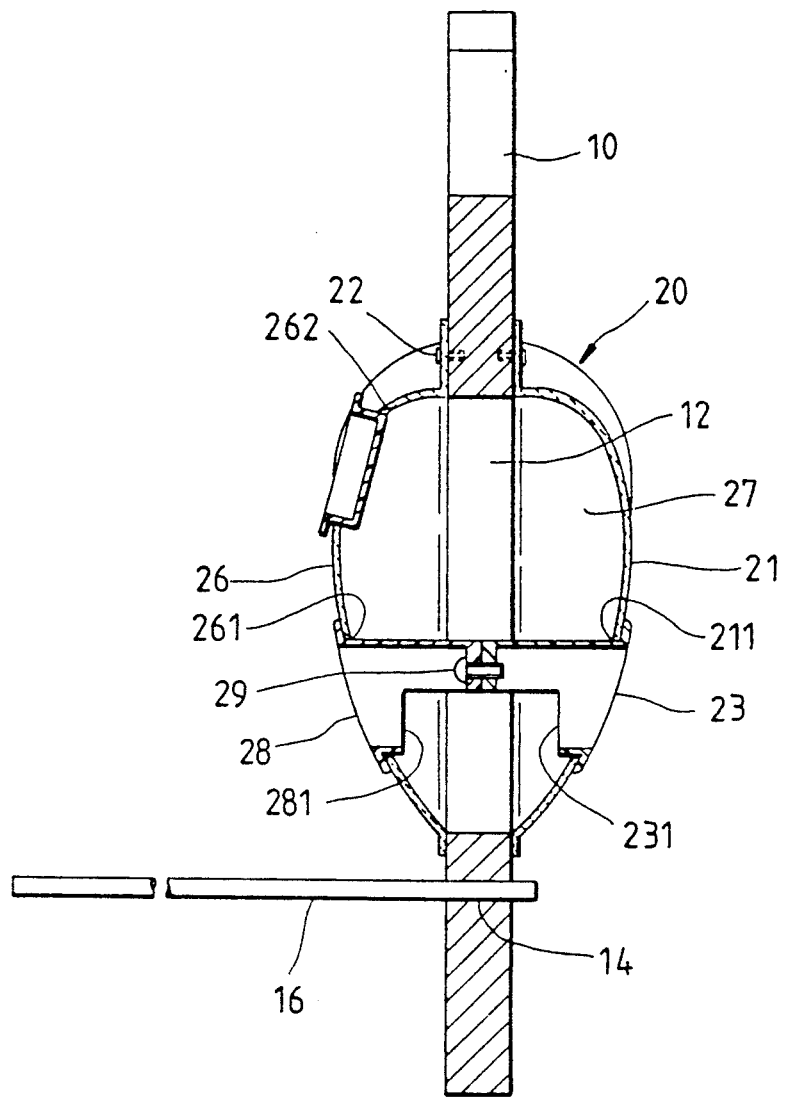
FIG. 3 shows a longitudinal sectional view of the preferred embodiment in combination, according to the present invention.

As shown in FIGS. 1-3, a bird feeder embodied in the present invention comprises mainly a decorating face plate 10 and a feed set 20.

The decorating face plate 10 of a cow-shaped construction is provided centrally with a heart-shaped through hole 12. Located under the through hole 12 is a through cavity 14 dimensioned to receive and hold flexibly a rod 16 for birds to stand thereon.

The feeding set 20 is composed of two heart-shaped shells 21 and 26, which are corresponding in dimension to the heart-shaped through hole 12 of the decorating face plate 10. The shells 21 and 26 are made of a transparent acrylic material and provided respectively with an arcuate surface. The shells 21 and 26 are further provided respectively in the lower portion thereof with feeding ports 211 and 261 of triangular construction. The shell 26 is provided in the upper portion thereof with a feed supplying port 262. In combination, the shells 21 and 26 are fastened by screws 22 to the opposite side edges of the through hole 12 of the decorating face plate 10 such that the shells 21 and 26 and the interior of the through hole 12 form jointly a receiving space 27. Two protective masks 23 and 28 are inserted respectively into the feeding ports 211 and 261. The protective masks 23 and 28 are provided respectively in the lower portions thereof with slots 231 and 281, which are in communication with the receiving space 27. The protective masks 23 and 28 are fastened securely and respectively to the shells 21 and 26 by means of a screw 29. In addition, the protective masks 23 and 28 are secured to the feeding ports 211 and 261 by means of two cross beams 17 of the protective masks 23 and 28.

Figure 4:
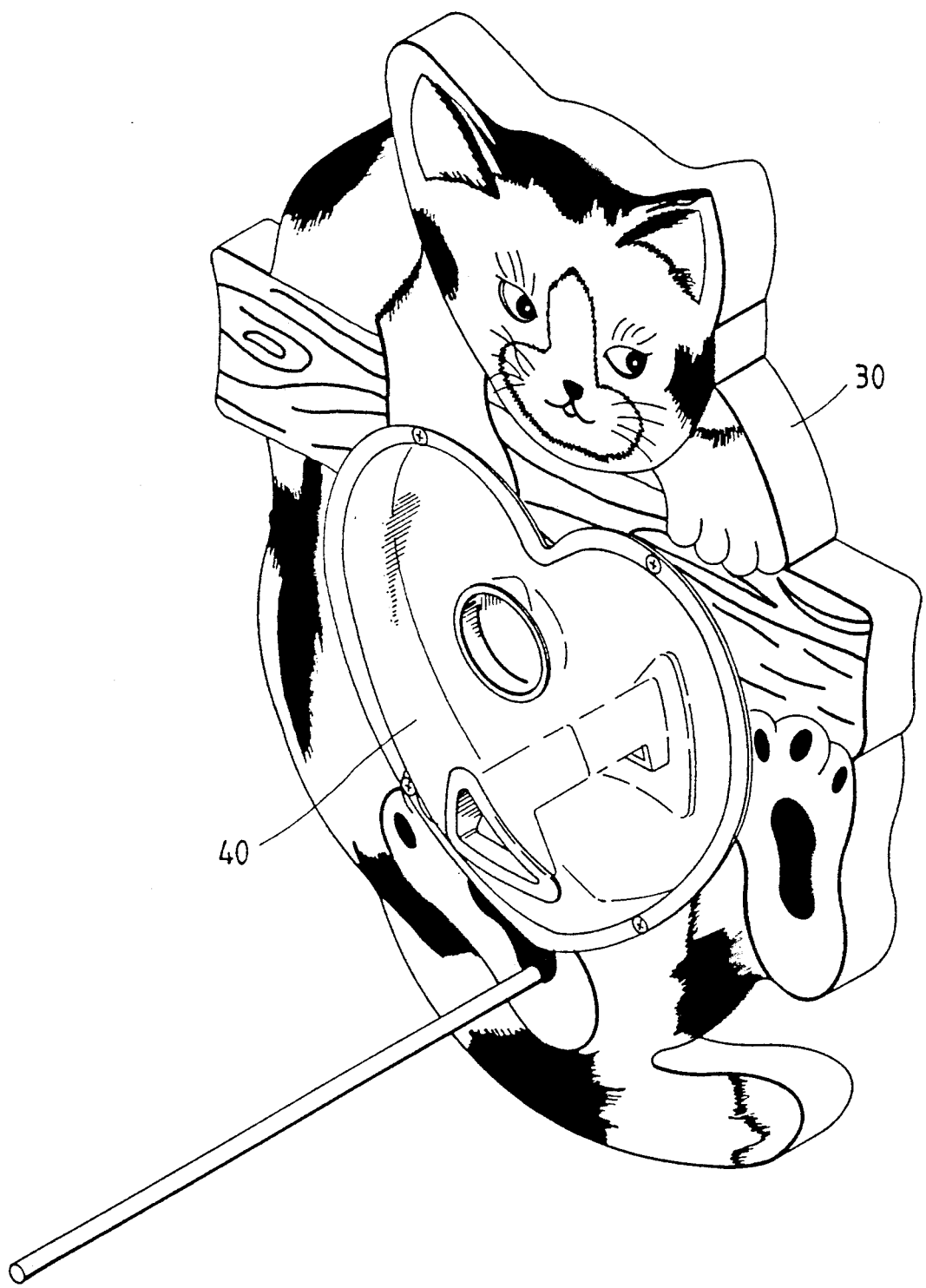
FIG. 4 shows a perspective view of another preferred embodiment of the present invention.

As shown in FIG. 4, a bird feeder of another preferred embodiment of the present invention comprises a decorating face plate 30 and a feeding set 40. The decorating face plate 30 is of a cat-like construction.

The features of the bird feeder of the present invention are readily apparent and described further hereinafter.

The feed kept in the receiving space 27 is protected from the wind and the rain in view of the fact that the feeding ports 211 and 261 are shielded by the arcuate surfaces of the shells 21 and 26 and by the protective masks 23 and 28 which are secured to feeding ports 211 and 261 by cross beams thereof.

The feed is kept in the central portion of the receiving space 27 and is therefor easily accessible to birds. In the prior art bird feeders, the feed is kept all over the receiving space, even around the hard-to-reach corners of the received space.

The bird feeder of the present invention is so designed that the birds can be fed easily and quickly. In addition, the bird feeder of the present invention is artistically and ornamentally designed to lend an added beauty to the landscape of a house.

The embodiments of the present invention described above are to be regarded in all respects as merely illustrative and not restrictive. Accordingly, the present invention may be embodied in other specific forms without deviating from the spirit thereof. The present invention is therefore to be limited only by the scope of the following appended claims.

What is claimed is:

1. A bird feeder comprising a decorating face plate and a feeding set; wherein said decorating face plate is provided centrally with a through hole, under which a through cavity of a predetermined dimension is disposed for receiving and holding a rod intended for birds to stand thereon; wherein said feeding set comprises two shells of a transparent material and fastened respectively to two opposite side edges of said through hole of said decorating face plate, with said two shells having an arcuate surface and being provided respectively and correspondingly at a lower portion thereof with a feeding port, and with one of said two shells being provided at an upper portion thereof with a feed supplying port, said feeding port being provided with a protective mask having a slot; wherein said shells are fastened by fasteners to said through hole of said decorating face plate such that an interior of said through hole and said two shells form jointly a receiving space having a predetermined capacity to contain a predetermined quantity of feed; and wherein said protective mask is provided with a cross beam by which said protective mask is secured to said feeding port.

2. The bird feeder of claim 1 wherein said through hole of said decorating face plate is of a heart-shaped construction and is corresponding in construction to said two shells of said feeding set.

* * * * *